June 8, 1965   E. O. SCHWEITZER, JR   3,188,544
ELECTRIC CURRENT CONVERTING MEANS
Original Filed June 27, 1956
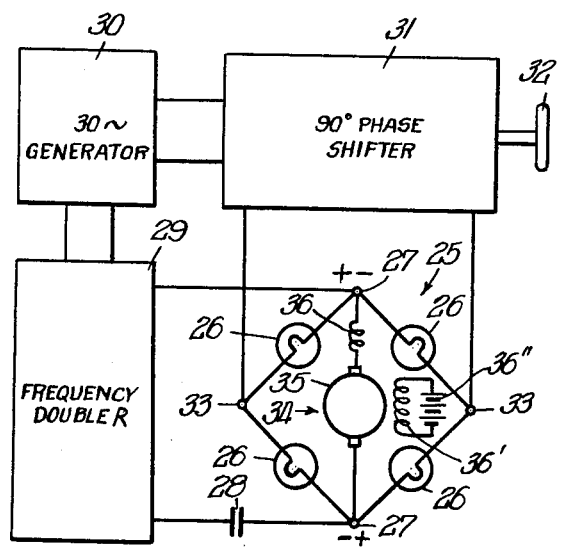
INVENTOR.
Edmund O. Schweitzer, Jr.,
BY Robert R. Lockwood
ATTY

United States Patent Office 3,188,544
Patented June 8, 1965

---

3,188,544
ELECTRIC CURRENT CONVERTING MEANS
Edmund O. Schweitzer, Jr., 1002 Dundee Road,
Northbrook, Ill.
Original application June 27, 1956, Ser. No. 594,322.
Divided and this application Feb. 21, 1962, Ser. No. 174,810
5 Claims. (Cl. 318—257)

This invention relates, generally, to electric current converting means and it has particular relation to converting alternating current to direct current. This application is a division of application Serial No. 594,322, filed June 27, 1956, now abandoned, as a continuation-in-part of application Serial No. 576,564, filed April 6, 1956, now Patent No. 3,004,381, issued October 17, 1961.

Among the objects of this invention are: To convert a pair of alternating currents having a fixed relation to each other to direct current; to vary the magnitude and direction of flow of the direct current by shifting the relative phase positions of the alternating currents; and to employ the direct current output for operating a motor or like device requiring variations in magnitude of current flow or reversal of current flow for operation or for other purposes.

The single figure of the drawing illustrates, diagrammatically, how the bridge circuit of the present invention, having non-linear current conducting devices in each of the branches, can be employed for controlling the operation of a device such as an electric motor.

Referring now particularly to the drawing, it will be observed that the reference character 25 refers to a bridge circuit which employs four devices 26, one in each arm, which have non-linear current carrying characteristics. In this instance it is desired to obtain a substantial amount of power from the bridge circuit 25 and to employ relatively low frequency for producing the required amount of direct current. For this purpose it is possible to use tungsten filament lamps or thyrite varistors for the devices 26. The direct current terminals 27 of the bridge are connected through a capacitor 28 to a source 29 of double frequency, for example, a frequency of 60 cycles per second. The source 29 is a frequency doubler which is energized from a source 30 of alternating current, such as a 30 cycle generator. Provision is made by means of a 90° phase shifter 31 for shifting the phase of the 30 cycle current with respect to the second harmonic or output of the frequency doubler 29. A hand wheel 32 is employed for manual control. It will be understood that the phase shifter 31 may be of the type described in the above applications for shifting the phase through 360° but arranged merely to employ only one-fourth of its range since a complete reversal of the polarity applied to the terminals 27 can be obtained through a 90° phase shift as will be understood readily. The output from the phase shifter 31 is applied to the terminals 33 of the bridge 25. It will be understood that the phase of the second harmonic from the frequency doubler 29 can be shifted with respect to the phase of the output of the 30 cycle generator 30, if desired.

A load device, such as a direct current motor shown generally at 34, is connected between the terminals 27.

It may include an armature 35 and a series field winding 36 connected in series circuit relation therewith. In addition, a separately excited field winding 36' is employed and is energized from a suitable direct current source, such as a battery 36".

By shifting the position of the phase shifter 31 by the hand wheel 32 or other suitable means, it is possible to change the magnitude and polarity of the direct current flowing between the terminals 27 and thus to change the speed and direction of rotation of the armature 35.

It is possible to omit two of the non-linear devices 26 from the bridge 25 and employ in lieu thereof resistors or a potentiometer. However, the output of the bridge is decreased by over fifty percent if only two of the non-linear current conducting devices 26 are used.

What is claimed as new is:

1. A motor control system comprising, in combination, a four arm bridge circuit having in at least each of two adjacent arms a non-linear resistance device, means for energizing a pair of opposite terminals of said bridge circuit from a source of alternating current, means for energizing the remaining pair of opposite terminals of said bridge circuit at least one of which is between said non-linear resistance devices from a source of alternating current the frequency of which is twice that of the first mentioned alternating current, a direct current motor connected between said remaining pair of terminals, and means for shifting the phase of one of said alternating currents with respect to that of the other to vary the operation of said motor.

2. A motor control system comprising, in combination, a four arm bridge circuit having in at least each of two adjacent arms a non-linear resistance device, means for energizing a pair of opposite terminals of said bridge circuit from a source of alternating current, means for energizing the remaining pair of opposite terminals of said bridge circuit at least one of which is between said non-linear resistance devices from a source of alternating current the frequency of which is twice that of the first mentioned alternating current, a direct current motor having armature and field windings one of which is separately excited and the other is connected between said remaining pair of terminals, and means for shifting the phase of one of said alternating currents with respect to that of the other to vary the speed and direction of rotation of said motor.

3. The invention, as set forth in claim 1, wherein each of the four arms of the bridge circuit includes a non-linear resistance device.

4. The invention, as set forth in claim 1, wherein the non-linear resistance device is a tungsten filament lamp.

5. The invention, as set forth in claim 1, wherein the non-linear resistance device is a thyrite varistor.

References Cited by the Examiner

UNITED STATES PATENTS

| | | | |
|---|---|---|---|
| 2,104,801 | 1/38 | Hansell | 318—318 X |
| 2,648,811 | 8/53 | Sohon | 321—59 |
| 2,714,635 | 8/55 | Schmitt | 307—2 |
| 2,749,499 | 6/56 | Hosticka et al. | 321—60 |
| 2,876,408 | 3/59 | Alexanderson | 318—345 |

ORIS L. RADER, *Primary Examiner.*